United States Patent [19]

Kimura et al.

[11] Patent Number: 5,352,426
[45] Date of Patent: Oct. 4, 1994

[54] METHOD FOR THE PREPARATION OF COPRECIPITATED CARBONATE OF LANTHANUM, CERIUM AND TERBIUM

[75] Inventors: Yuji Kimura; Shigeru Sakai; Norifumi Yoshida, all of Fukui, Japan

[73] Assignee: Shin-Etsu Chemical Co., Ltd., Tokyo, Japan

[21] Appl. No.: 164,453

[22] Filed: Dec. 9, 1993

[30] Foreign Application Priority Data

Dec. 16, 1992 [JP] Japan .................................. 4-354557
Dec. 16, 1992 [JP] Japan .................................. 4-354558

[51] Int. Cl.$^5$ ............................................. C01F 17/00
[52] U.S. Cl. .............................. 423/263; 252/301.4 P; 423/420.2
[58] Field of Search ........................... 423/263, 420.2; 252/301.4 P

[56] References Cited

U.S. PATENT DOCUMENTS

| | | | |
|---|---|---|---|
| 4,263,164 | 4/1981 | Swinkels et al. | 423/263 |
| 4,423,349 | 12/1983 | Nakajima et al. | 252/301.4 P |
| 4,497,785 | 2/1985 | Tilley et al. | 423/263 |
| 5,015,452 | 5/1991 | Matijevic | 423/263 |
| 5,045,289 | 9/1991 | Fernando et al. | 423/263 |

OTHER PUBLICATIONS

Nagashima et al "Bull. Chem. Soc. Japan", vol. 46, pp. 152–156, 1973.

*Primary Examiner*—Jack Cooper
*Attorney, Agent, or Firm*—Wenderoth, Lind & Ponack

[57] ABSTRACT

An improved method is proposed for the preparation of a composite carbonate powder of lanthanum, cerium and terbium as a base material of a green-emitting phosphor for which the carbonate powder is desired to have a uniform particle size distribution and a particle configuration as close to spherical as possible. The improved method is characterized by two-step heat treatment of the carbonate slurry formed by the addition of, for example, ammonium hydrogen carbonate to a mixed aqueous solution of lanthanum, cerium and terbium nitrates each under specified conditions while the pH of the aqueous slurry is adjusted to 5.0 to 7.5 after the first step heat treatment but before the second step heat treatment.

9 Claims, No Drawings

METHOD FOR THE PREPARATION OF COPRECIPITATED CARBONATE OF LANTHANUM, CERIUM AND TERBIUM

BACKGROUND OF THE INVENTION

The present invention relates to a method for the preparation of a coprecipitated carbonate of lanthanum, cerium and terbium. More particularly, the invention relates to a method for the preparation of a powder of a coprecipitated carbonate of lanthanum, cerium and terbium consisting of relatively uniform particles of a spheroidal particle configuration and suitable as a starting material of a green-emitting phosphor used in three-wavelength type fluorescent lamps.

Rare earth-based green-emitting phosphors used in fluorescent lamps are prepared by converting a composite oxide of lanthanum, cerium and terbium into a composite phosphate by the dryprocess high-temperature reaction with a reactive phosphate compound followed by a flux treatment of the composite rare earth-based phosphate. It is a requirement in the phosphor-preparing process in general that the powder of the phosphor has a particle size distribution as narrow as possible. In this regard, it is also desirable that the rare earth-based composite oxide of lanthanum, cerium and terbium as the starting material of the green-emitting phosphor has a narrow particle size distribution. Nevertheless, the particle size distribution of the composite oxide products of lanthanum, cerium and terbium produced by the manufacturers of rare earth-based products is not so narrow as desired by the phosphor manufacturers. As to the particle configuration, in addition, the products of the composite oxide of lanthanum, cerium and terbium as produced and supplied by the manufacturers of rare earth-based products mostly have a rod-like particle configuration and are far from spherical particles considered as ideal by the manufacturers of phosphors so that the phosphors produced therefrom also have a rod-like particle configuration.

In order that a composite oxide of lanthanum, cerium and terbium has a narrow particle size distribution and a particle configuration as close to spherical as possible, the precursor of the composite oxide powder, which is a composite carbonate powder of lanthanum, cerium and terbium to be converted into the composite oxide by calcination, also should have a particle size distribution as narrow as possible and a particle configuration close to spherical. As is known, a rare earth-based composite carbonate of lanthanum, cerium and terbium is prepared by the method of coprecipitation in which an aqueous solution of inorganic acid salts, e.g., nitrates, of these rare earth elements in combination is admixed with an aqueous solution of a water-soluble carbonate having alkalinity such as ammonium carbonate, ammonium hydrogen carbonate and the like to coprecipitate the rare earth elements jointly in the form of precipitates of the rare earth carbonates followed by the recovery of the precipitates by filtration, washing with water and drying to give a coprecipitated carbonate of lanthanum, cerium and terbium. Notwithstanding the requirements by the phosphor manufacturers for the particle size distribution and particle configuration of the coprecipitated carbonate of lanthanum, cerium and terbium as mentioned above, no method is known in the prior art by which these requirements can be satisfied.

SUMMARY OF THE INVENTION

The present invention accordingly has an object to provide a novel and improved method for the preparation of a coprecipitated carbonate of lanthanum, cerium and terbium having a narrow particle size distribution and particle configuration close to spherical by the procedure of coprecipitation of a composite carbonate of these rare earth elements from an aqueous solution of water-soluble inorganic salts of these elements with addition of a water-soluble carbonate having alkalinity.

Thus, the method of the present invention for the preparation of a coprecipitated carbonate of lanthanum, cerium and terbium, of which the molar fraction of terbium does not exceed 30%, comprises the successive steps of:

(a) adding, to an aqueous solution of inorganic acid salts of lanthanum, cerium and terbium in combination at a temperature not exceeding 40° C., a water-soluble inorganic carbonate having alkalinity in an amount in excess by at least 20% over the stoichiometrically equivalent amount to completely precipitate lanthanum, cerium and terbium in the form of precipitates of a composite of the respective carbonates to form an aqueous slurry of the carbonate powder;

(b) heating the aqueous slurry containing the coprecipitated carbonate of lanthanum, cerium and terbium at a temperature of 50° C. or higher or, preferably, in the range from 55° to 65° C. for at lest 1 hour or, preferably, a length of time in the range from 2 to 6 hours;

(c) adjusting the pH value of the aqueous slurry containing the coprecipitated carbonate of lanthanum, cerium and terbium in the range from 5.0 to 7.5 by the addition of a pH-adjusting agent;

(d) heating the aqueous slurry containing the coprecipitated carbonate of lanthanum, cerium and terbium after the pH adjustment in step (c) at a temperature of 60° C. or higher or, preferably, in the range from 80° to 95° C. for at least 1 hour; and (e) recovering the precipitates of the coprecipitated carbonate of lanthanum, cerium and terbium from the aqueous slurry followed by washing with water and drying.

In a first embodiment of the above defined inventive method, the pH-adjusting agent added to the aqueous slurry of the carbonate precipitates in step (c) is an inorganic acid. In a second embodiment of the inventive method, the pH-adjusting agent used in step (c) is an aqueous solution of the inorganic acid salts of lanthanum, cerium and terbium.

DETAILED DESCRIPTION OF THE PREFERRED EMBODIMENTS

The most characteristic feature in the above defined method of the present invention consists in the heat treatment of the aqueous slurry containing the precipitates of the coprecipitated carbonates of lanthanum, cerium and terbium as precipitated and after the adjustment of the pH value of the aqueous slurry to effect aging of the precipitated particles.

In step (a) of the inventive method, an aqueous solution of inorganic acid salts of lanthanum, cerium and terbium is admixed with a water-soluble carbonate having alkalinity as a precipitant. The aqueous solution of the salts can be prepared by dissolving the respective oxides of lanthanum, cerium and terbium in a specified proportion in an inorganic acid. Nitric acid is preferable as the inorganic acid as compared with other inorganic acids such as hydrochloric and sulfuric acids because of the relatively small residual content of the acid radical in the composite rare earth oxide prepared by the calcination of the composite rare earth carbonate. The concentration of the rare earth nitrates in the aqueous solution is preferably in the range from 0.1 to 1.0 mole/liter as the total of the three kinds of the rare earth elements. The aqueous solution naturally contains the free inorganic acid and the concentration of the free acid should be in the range from 0.001 to 0.05 mole/liter. The precipitant to be added to the aqueous solution of the inorganic acid salts, e.g., nitrates, of the rare earth elements is a water-soluble carbonate having alkalinity. Preferably, the precipitant is ammonium carbonate or ammonium hydrogen carbonate. The amount of the precipitant added to the aqueous solution of the rare earth salts should be in excess by at least 20% or, preferably, by 30 to 80% over the stoichiometrically equivalent amount to the rare earth salts. This amount of the precipitant, i.e. carbonate, does not include the amount of the carbonate consumed for the neutralization of the free acid in the aqueous solution of the inorganic rare earth salts. When the amount of the precipitant is too small, the resultant carbonate powder would contain a considerable amount of very fine particles having a non-controlled particle configuration. The precipitant, i.e. ammonium carbonate or ammonium hydrogen carbonate, is added to the aqueous solution of the rare earth salts in the form of an aqueous solution prepared in advance in a concentration in the range from 5 to 25% by weight and the carbonate solution is added to the rare earth solution kept at 40° C. or below under vigorous agitation over a period of 3 to 10 minutes so as to coprecipitate the carbonates of lanthanum, cerium and terbium in the form of an aqueous slurry of the precipitates.

In step (b) of the inventive method, the aqueous slurry of the coprecipitated rare earth carbonates is subjected to a heat treatment to effect aging of the precipitates. The temperature of the heat treatment should be 50° C. or higher or, preferably, in the range from 55° to 65° C. and the length of time for the heat treatment is at least 1 hour or, preferably, in the range from 3 to 6 hours. When the temperature of this heat treatment is too low, the precipitated particles would grow in a platelet-like form.

In step (c) of the inventive method, the pH value of the aqueous slurry, which is alkaline by the addition of an excess amount of ammonium carbonate or ammonium hydrogen carbonate, after step (b) is adjusted to be in the range from 5.0 to 7.5 before the second heat treatment in step (d). Although the pH value of the aqueous slurry can be adjusted by the addition of a volume of water, it is preferable to admix the aqueous slurry with an inorganic acid which is preferably nitric acid. When the pH value of the aqueous slurry is higher than 7.5, the length of time taken for the second heat treatment in step (d) must be unduly long in order to obtain the desirable properties of the carbonate particles. The content of the precipitates in the aqueous slurry should be adjusted preferably not to exceed 0.05 mole/liter. The length of time for the second heat treatment in the subsequent step (d) must be extended also when the content of the precipitates in the aqueous slurry is too high.

Alternatively, the pH value of the aqueous slurry can be adjusted to 5.0 to 7.5 by the addition of an aqueous solution of the inorganic acid salts of the rare earth elements, i.e. lanthanum, cerium and terbium. The inorganic acid salts are preferably the same ones in the starting aqueous solution. For example, nitrates of lanthanum, cerium and terbium are preferred when the starting aqueous solution is a solution of the rare earth nitrates. The proportion of the lanthanum, cerium and terbium nitrates in this adjuvant is also preferably the same as in the starting aqueous solution. The amount of the adjuvant rare earth salts is usually in the range from 1/5 to ½ or, in most cases, from ¼ to ½ of the rare earth salts contained in the starting aqueous solution. Deficiency in the amount of the adjuvant rare earth salts solution results in a too high pH value of the aqueous slurry while a portion of the rare earth salts remains as such without being precipitated in the form of a carbonate by the reaction with the excess amount of the precipitant in the aqueous slurry when the amount of the adjuvant rare earth salts is too large.

In step (d) of the inventive method, the aqueous slurry after the pH adjustment in step (c) in the above described manner is subjected to a second heat treatment at a temperature of 60° C. or higher or, preferably, in the range from 80° to 95° C. for at least 1 hour or, preferably, for a length of time in the range from 3 to 6 hours. When the temperature is too low, the length of time for the heat treatment must be unduly extended while a too high temperature of the heat treatment is undesirable due to the evaporation of water from the aqueous slurry.

In step (e) of the inventive method, the precipitates of the composite carbonate of lanthanum, cerium and terbium are recovered from the aqueous slurry by a suitable procedure of solid-liquid separation such as filtration and centrifugation and the thus separated carbonate is thoroughly washed with water and dried. The conditions in these procedures can be conventional.

In the following, the method of the present invention is described in more detail by way of examples which, however, never limit the scope of the invention in any way.

Example 1

One liter of an aqueous solution containing 0.1 mole/liter of lanthanum nitrate, 0.07 mole/liter of cerium nitrate and 0.03 mole/liter of terbium nitrate, of which the concentration of free nitric acid was 0.001 mole/liter, was admixed at room temperature under vigorous agitation with 1 liter of an aqueous solution containing 79 g (1 mole) of ammonium hydrogen carbonate over a period of 10 minutes to give an aqueous slurry of a composite carbonate of lanthanum, cerium and terbium formed by coprecipitation in the form of very fine particles. The amount of the ammonium hydrogen carbonate was in excess by 67% over the stoichiometrically equivalent amount to the rare earth nitrates in the starting aqueous solution. This aqueous slurry had a pH value of 8.5.

In the next place, the thus obtained aqueous slurry of the rare earth carbonate was heated and kept at 50° C. for 2 hours so that growth of the very fine carbonate particles took place to give particles having a particle diameter of about 10 μm.

Thereafter, a small volume of 1N nitric acid was added to the aqueous slurry so that the pH of the aqueous slurry was adjusted to 7.0. The aqueous slurry after this pH adjustment was heated and kept at 80° C. for 3 hours so as to effect further aging of the carbonate particles. The aqueous slurry was filtered and the cake of the carbonate was thoroughly washed with water and dried at 90° C. for 16 hours followed by disintegration into a composite carbonate powder having an average particle diameter of about 6 μm.

Comparative Example 1

The experimental procedure was substantially the same as in Example 1 except that the amount of the ammonium hydrogen carbonate was decreased to 47.4 g (0.6 mole) to be stoichiometrically equivalent to the rare earth nitrates in the starting aqueous solution. The thus obtained composite rare earth carbonate powder was in the form of very fine particles.

Comparative Example 2

The experimental procedure was substantially the same as in Example 1 excepting for the omission of the first-step heat treatment of the aqueous slurry at 50° C. for 2 hours. The thus obtained composite rare earth carbonate powder, however, contained a substantial amount of very fine particles.

Comparative Example 3

The experimental procedure was substantially the same as in Example 1 except that the aqueous slurry after the first heat treatment at 50° C. for 2 hours was subjected as such to the second heat treatment at 70° C. for 12 hours without adjustment of the pH value. The thus obtained composite rare earth carbonate powder consisted of very fine particles.

Example 2

One liter of an aqueous solution containing 0.1 mole/liter of lanthanum nitrate, 0.07 mole/liter of cerium nitrate and 0.03 mole/liter of terbium nitrate, of which the concentration of free nitric acid was 0.001 mole/liter, was admixed at room temperature under vigorous agitation with 1 liter of an aqueous solution containing 79 g (1 mole) of ammonium hydrogen carbonate over a period of 10 minutes to give an aqueous slurry of a composite carbonate of lanthanum, cerium and terbium formed by coprecipitation in the form of very fine particles. The amount of the ammonium hydrogen carbonate was in excess by 67% over the stoichiometrically equivalent amount to the rare earth nitrates in the starting aqueous solution. This aqueous slurry had a pH value of 8.5.

In the next place, the thus obtained aqueous slurry of the composite rare earth carbonate was heated and kept at 50° C. for 2 hours so that growth of the very fine carbonate particles took place to give particles having an average particle diameter of about 10 μm. The pH value of the slurry was slightly changed to 7,8.

Thereafter, a 200 ml portion of the same mixed rare earth nitrate solution of lanthanum, cerium and terbium as used as the starting solution was added to the aqueous slurry so that the pH value of the aqueous slurry dropped to 6.9. The aqueous slurry after the pH adjustment in the above described manner is again heated and kept at 80° C. for 3 hours to effect aging of the carbonate particles followed by filtration of the slurry to collect the precipitates which were thoroughly washed with water and dried to give a composite carbonate powder of lanthanum, cerium and terbium of a relatively uniform particle size distribution with an average particle diameter of about 5 μm.

Comparative Example 4

The experimental procedure was substantially the same as in Example 2 except that the amount of the ammonium hydrogen carbonate added to the starting rare earth nitrate solution was stoichiometrically equivalent to the rare earth nitrates. The thus prepared composite rare earth carbonate powder of lanthanum, cerium and terbium consisted of very fine particles.

Comparative Example 5

The experimental procedure was substantially the same as in Example 2 except that the first heat treatment of the aqueous slurry at 50° C. for 2 hours was omitted. The thus prepared composite rare earth carbonate powder of lanthanum, cerium and terbium contained a substantial amount of very fine particles.

What is claimed is:

1. A method for the preparation of a composite carbonate powder of lanthanum, cerium and terbium in which the molar fraction of terbium does not exceed 30% which comprises the successive steps of:
   (a) adding, to an aqueous solution of inorganic acid salts of lanthanum, cerium and terbium in combination at a temperature of 40° C. or lower, a water-soluble inorganic carbonate having alkalinity in an amount in excess by at least 20% over the stoichiometrically equivalent amount to completely precipitate lanthanum, cerium and terbium in the form of precipitates of a composite of the respective carbonates to give an aqueous slurry;
   (b) heating the aqueous slurry containing the coprecipitated carbonate of lanthanum, cerium and terbium at a temperature of 50° C. or higher for at least 1 hour;
   (c) adjusting the pH value of the aqueous slurry containing the coprecipitated carbonate of lanthanum, cerium and terbium in the range from 5.0 to 7.5 by the addition of a pH-adjusting agent;
   (d) heating the aqueous slurry containing the coprecipitated carbonate of lanthanum, cerium and terbium after the pH adjustment in step (c) at a temperature of 60° C. or higher for at least 1 hour; and
   (e) recovering the precipitates of the coprecipitated carbonate of lanthanum, cerium and terbium from the aqueous slurry followed by washing with water and drying.

2. The method for the preparation of a composite carbonate powder of lanthanum, cerium and terbium as claimed in claim 1 in which the pH-adjusting agent is an inorganic acid.

3. The method for the preparation of a composite carbonate powder of lanthanum, cerium and terbium as claimed in claim 1 in which the pH-adjusting agent is an aqueous solution of inorganic acid salts of lanthanum, cerium and terbium.

4. The method for the preparation of a composite carbonate powder of lanthanum, cerium and terbium as claimed in claim 1 in which the water-soluble inorganic carbonate having alkalinity is ammonium carbonate or ammonium hydrogen carbonate.

5. The method for the preparation of a composite carbonate powder of lanthanum, cerium and terbium as claimed in claim 1 in which the amount of the water-soluble inorganic carbonate having alkalinity is in excess by 30% to 80% over the stoichiometrically equivalent amount to completely precipitate lanthanum, cerium and terbium.

6. The method for the preparation of a composite carbonate powder of lanthanum, cerium and terbium as claimed in claim 1 in which the temperature of heating in step (b) is in the range from 55° to 65° C.

7. The method for the preparation of a composite carbonate powder of lanthanum, cerium and terbium as claimed in claim 1 in which the temperature of heating in step (d) is in the range from 80° to 95° C.

8. The method for the preparation of a composite carbonate powder of lanthanum, cerium and terbium as claimed in claim 1 in which the inorganic acid salts of lanthanum, cerium and terbium are nitrates of lanthanum, cerium and terbium.

9. The method for the preparation of a composite carbonate powder of lanthanum, cerium and terbium as claimed in claim 1 in which the concentration of the inorganic acid salts of lanthanum, cerium and terbium in the aqueous solution is in the range from 0.1 to 1.0 mole/liter as a total of the inorganic acid salts of lanthanum, cerium and terbium.

* * * * *